United States Patent
Goodsitt et al.

(10) Patent No.: US 10,438,010 B1
(45) Date of Patent: Oct. 8, 2019

(54) OBFUSCATION OF INPUT DATA PROVIDED TO A TRANSACTION DEVICE

(71) Applicant: Capital One Services, LLC, McLean, VA (US)

(72) Inventors: Jeremy Goodsitt, Champaign, IL (US); Austin Walters, Savoy, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/225,762

(22) Filed: Dec. 19, 2018

(51) Int. Cl.
| | | |
|---|---|---|
| *G06F 21/00* | (2013.01) | |
| *G06F 21/60* | (2013.01) | |
| *G06F 3/041* | (2006.01) | |
| *G07F 7/10* | (2006.01) | |
| *G07F 19/00* | (2006.01) | |

(52) U.S. Cl.
CPC .......... *G06F 21/604* (2013.01); *G06F 3/041* (2013.01); *G07F 7/10* (2013.01); *G07F 19/207* (2013.01)

(58) Field of Classification Search
CPC .......... G07F 19/20; G07F 19/207; G07F 7/10; G06F 21/604; G06F 21/606; G06F 3/041
See application file for complete search history.

(56) References Cited

U.S. PATENT DOCUMENTS

| | | | |
|---|---|---|---|
| 5,498,931 A | 3/1996 | Bedocs | |
| 5,673,082 A | 9/1997 | Wells | |
| 5,912,454 A | 6/1999 | Castillo | |
| 6,308,887 B1 * | 10/2001 | Korman | G06Q 20/18 235/379 |
| 6,446,865 B1 | 9/2002 | Holt et al. | |
| 6,497,503 B1 | 12/2002 | Dassanayake | |
| 7,227,611 B2 | 6/2007 | Hull | |
| 7,362,973 B1 * | 4/2008 | Dickson | G06F 21/83 398/40 |
| 7,619,366 B2 | 11/2009 | Diederiks | |
| 8,761,594 B1 | 6/2014 | Gross | |
| 9,276,740 B2 * | 3/2016 | Nix | H04W 4/70 |
| 9,345,090 B2 | 5/2016 | Tiberi | |
| 9,702,619 B2 | 7/2017 | Kendall | |
| 9,756,169 B2 | 9/2017 | Mehta | |

(Continued)

OTHER PUBLICATIONS

Michael Zhang, "Watch Flashback Anti-Paparazzi Clothing Ruin Flash Photographs", https://petapixel.com/2015/02/25/watch-flashback-anti-paparazzi-clothing-ruin-flash-photographs/, Feb. 25, 2015, 9 pages.

(Continued)

*Primary Examiner* — Hosuk Song
(74) *Attorney, Agent, or Firm* — Harrity & Harrity, LLP

(57) ABSTRACT

An example described herein may involve receiving a temperature measurement associated with an input component, wherein the temperature measurement is received from a temperature sensor, and wherein the temperature measurement indicates a temperature of an input element of the input component; determining that the temperature of the input element satisfies a threshold temperature; and causing an infrared element to emit infrared light in association with a position of the input component. While the infrared element is emitting the infrared light, capture information associated with a user interacting with the input component may be obfuscated.

20 Claims, 10 Drawing Sheets

(56) References Cited

U.S. PATENT DOCUMENTS

| | | |
|---|---|---|
| 9,762,786 B2 | 9/2017 | Okada |
| 9,778,102 B2 | 10/2017 | Pang |
| 9,992,396 B1 | 6/2018 | Scepanovic |
| 10,048,379 B2 | 8/2018 | Markendorf |
| 2002/0080999 A1 | 6/2002 | Bani-Hashemi |
| 2002/0180973 A1 | 12/2002 | MacKinnon |
| 2004/0252835 A1 | 12/2004 | Odgers |
| 2005/0184217 A1 | 8/2005 | Kong |
| 2006/0098165 A1 | 5/2006 | Lynch |
| 2006/0183980 A1 | 8/2006 | Yang |
| 2006/0238617 A1 | 10/2006 | Tamir |
| 2007/0234220 A1 | 10/2007 | Khan |
| 2008/0078921 A1 | 4/2008 | Yang |
| 2008/0117060 A1 | 5/2008 | Cuddihy |
| 2008/0150791 A1 | 6/2008 | Robertson |
| 2009/0185358 A1 | 7/2009 | Liu |
| 2010/0092031 A1 | 4/2010 | Bergeron |
| 2010/0323608 A1 | 12/2010 | Sanhedrai |
| 2011/0222301 A1 | 1/2011 | Knoedgen |
| 2011/0130114 A1 | 6/2011 | Boudville |
| 2011/0175534 A1 | 7/2011 | Hsieh |
| 2012/0138821 A1 | 6/2012 | Joseph |
| 2012/0206050 A1 | 8/2012 | Spero |
| 2012/0229637 A1 | 9/2012 | Mooradian |
| 2013/0120984 A1 | 5/2013 | Hinrichs |
| 2013/0141233 A1 | 6/2013 | Jacobs |
| 2013/0293722 A1 | 11/2013 | Chen |
| 2014/0157442 A1 | 6/2014 | Elson |
| 2014/0211004 A1 | 7/2014 | Konno |
| 2015/0023019 A1 | 1/2015 | Chen |
| 2015/0035432 A1 | 2/2015 | Kendall |
| 2015/0035440 A1 | 2/2015 | Spero |
| 2015/0264236 A1 | 9/2015 | Okada |
| 2015/0296188 A1 | 10/2015 | Meganathan |
| 2016/0050345 A1 | 2/2016 | Longbotham |
| 2016/0252619 A1 | 9/2016 | Markendorf |
| 2017/0053171 A1 | 2/2017 | Buehler |
| 2017/0104939 A1 | 4/2017 | Sun |
| 2017/0115052 A1 | 4/2017 | Kendall |
| 2017/0138571 A1 | 5/2017 | Chen |
| 2017/0223653 A1* | 8/2017 | Weitnauer ......... H04W 56/0045 |
| 2017/0367785 A1 | 12/2017 | Munari |
| 2018/0048819 A1 | 2/2018 | Duran |
| 2018/0075308 A1 | 3/2018 | Song |
| 2018/0113986 A1 | 4/2018 | Zhu |
| 2018/0167539 A1 | 6/2018 | Fournier |
| 2018/0197157 A1 | 7/2018 | Magee |
| 2018/0288295 A1 | 10/2018 | Scepanovic |

OTHER PUBLICATIONS

Youtube, "Infra Red Invisible Mask" https://www.youtube.com/watch?v=jOH9XhsP3i1, Dec. 14, 2008, 1 page.

* cited by examiner

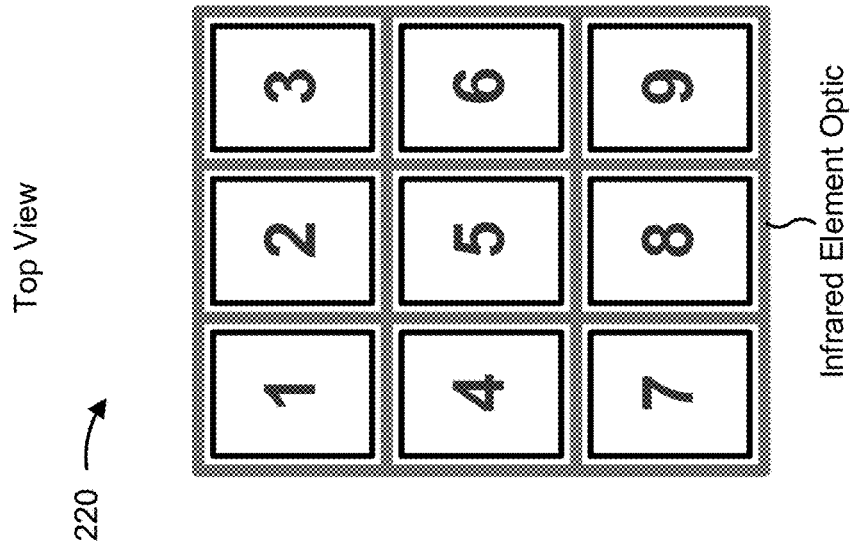
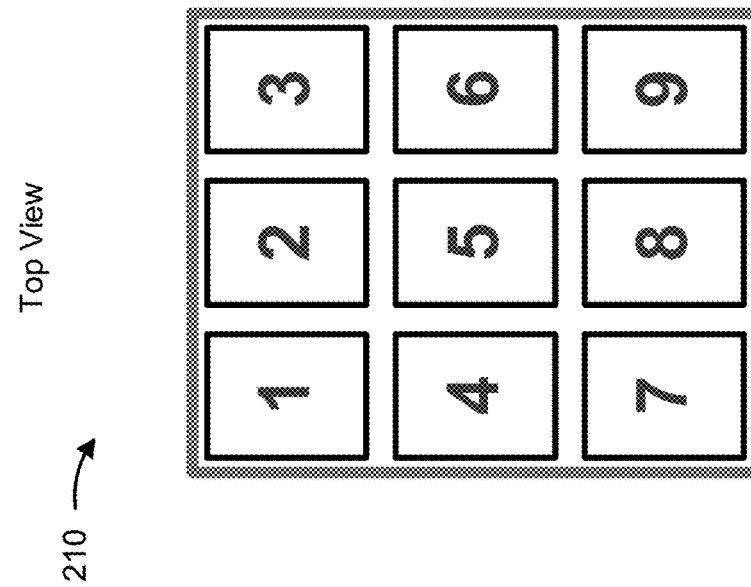
FIG. 2

US 10,438,010 B1

OBFUSCATION OF INPUT DATA PROVIDED TO A TRANSACTION DEVICE

BACKGROUND

A transaction device may include an automated teller machine (ATM) device, a point of sale (POS) device, a kiosk device, and/or the like. An ATM device is an electronic telecommunications device that enables customers of financial institutions to perform financial transactions, such as cash withdrawals, deposits, transferring funds, obtaining account information, and/or the like, at any time and without direct interaction with employees of the financial institutions. A POS device is an electronic device used to process transaction card payments at retail locations. A kiosk device is a computer terminal featuring specialized hardware and software that provides access to information and applications for communication, commerce, entertainment, education, and/or the like.

SUMMARY

According to some implementations, a device may include an input component; an infrared element associated with the input component; a temperature sensor; one or more memories; and one or more processors, communicatively coupled to the one or more memories, to: receive, from the temperature sensor, a first temperature measurement associated with the input component, wherein the first temperature measurement indicates a temperature of the input component; determine, based on the first temperature measurement indicating that the temperature of the input component satisfies a threshold temperature, that a user interacted with the input component; and cause the infrared element to emit infrared light until at least one of: a threshold time period, relative to determining that the temperature of the input component satisfies the threshold temperature, expires, or the temperature sensor provides a second temperature measurement that indicates that the temperature of the input component does not satisfy the threshold temperature, wherein, while the infrared element is emitting the infrared light, capture of information, associated with the user interacting with the input component, is obfuscated.

According to some implementations, a non-transitory computer-readable medium may store instructions that, when executed by one or more processors of a device, cause the one or more processors to: determine that a user interacted with an input element of an input component; determine, based on detecting that the user pressed the input element, a temperature of the input element; determine that the temperature of the input element is greater than an ambient temperature associated with an environment of the device; and cause an infrared element of the device to emit infrared light until the temperature of the input component is within a range of the ambient temperature, wherein, while the infrared element is emitting the infrared light, capture of information associated with the user interacting with the input element is obfuscated.

According to some implementations, a method may include receiving a temperature measurement associated with an input component, wherein the temperature measurement is received from a temperature sensor, and wherein the temperature measurement indicates a temperature of an input element of the input component; determining that the temperature of the input element satisfies a threshold temperature; and causing an infrared element to emit infrared light in association with a position of the input component, wherein, while the infrared element is emitting the infrared light, capture information associated with a user interacting with the input component may be obfuscated.

BRIEF DESCRIPTION OF THE DRAWINGS

FIGS. 1-4 are diagrams of example implementations described herein.

DETAILED DESCRIPTION

Figure 1:
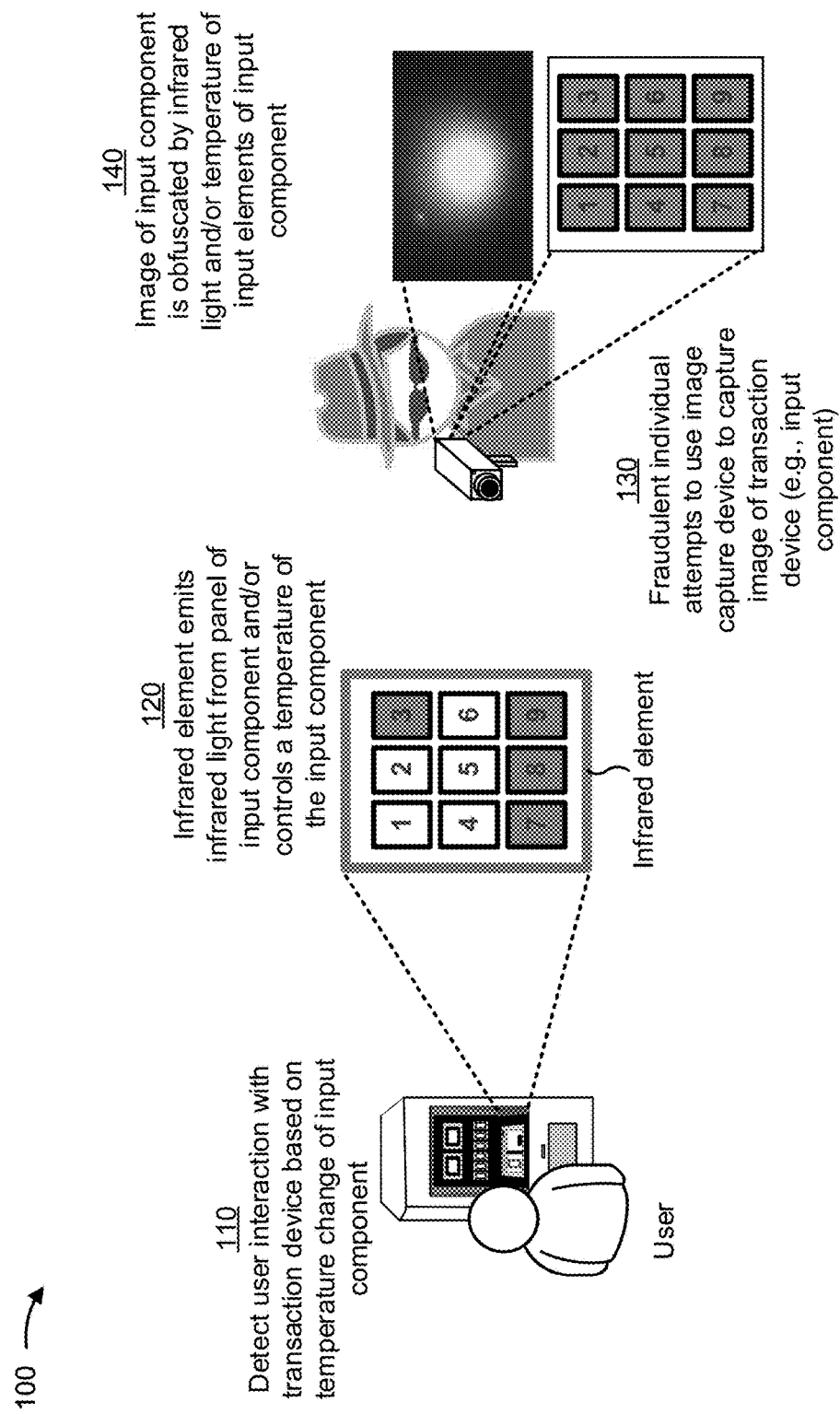

The following detailed description of example implementations refers to the accompanying drawings. The same reference numbers in different drawings may identify the same or similar elements.

A user of a transaction device may provide sensitive information (e.g., a personal identification number (PIN), an account number, a telephone number, and/or the like) as input data to the transaction device, and/or the transaction device may display such sensitive information. One of the easiest and fastest ways for a fraudulent individual to steal such sensitive information, when in physical proximity to the user of the transaction device and/or the transaction device, is to capture, with an image capture device (e.g., a camera, such as a video camera and/or a camera associated with a mobile device), an image or a series of images (e.g., a video) of the user interacting with the transaction device (e.g., by providing the sensitive information via an input component of the transaction device). Furthermore, when the user interacts with an input component (e.g., a keypad) of the transaction device, a thermal signature may be left by the user on the input component (e.g., due to heat being generated from the user's physical interaction with the input component). In such cases, even after the user leaves the transaction device, there is a period of time that a fraudulent individual may capture thermal images of the input component to detect which input elements (e.g., which keys of the keypad) were touched by the user via the thermal signatures. From a determination of which input elements were touched by the user, the fraudulent individual may determine the user's PIN (either directly or by trial and error). In some cases, the transaction device may include a cover that blocks a view of information input by the user of the transaction device, or the user may utilize a hand to block the view of the information input by the user. However, this may make inputting the information difficult for the user of the transaction device and may still not prevent image capture of the sensitive information and/or prevent image capture of thermal signatures on the input component.

Some implementations described herein provide a transaction device that causes thermal capture information associated with the user interacting with the input component to be obfuscated. For example, the device may include an input component (e.g., a keypad, a touchscreen display, and/or the like), an infrared element associated with the input component, and a temperature sensor. The device may receive, from the temperature sensor, temperature measurements that indicate temperatures of input elements of the input component and determine based on the temperatures that a user is about to interact, is currently interacting, or has interacted with the keypad. For example, if a temperature of an element satisfies (e.g., exceeds) a threshold temperature, the device may determine that a user interacted with the input component (or specifically the input element). In some implementations, the threshold temperature may be a static threshold temperature (e.g., a threshold temperature that corresponds to a heat signature of a human that interacted with the input element, such as approximately 30° C.). Additionally, or alternatively, the threshold temperature may be determined by a dynamic threshold that adjusts according to one or more temperature characteristics of the input component (e.g., an ambient temperature of an environment of the transaction device, an average temperature of a set of input elements of the input component, and/or the like). Based on the temperature of an input element satisfying the threshold, the device may cause the infrared element to emit infrared light (e.g., to blind an infrared capture device or thermal capture device).

Accordingly, the transaction device and/or one or more processes described herein may prevent fraud associated with a fraudulent individual unlawfully obtaining sensitive information associated with a user and/or an account of user. Therefore, the transaction device, as described herein, may conserve any computing resources (e.g., processing resources, memory resources, power resources, and/or the like) and/or network resources involved in correcting any fraudulent activity that would have occurred without the use of the transaction device as described herein.

FIG. 1 is a diagram of an example implementation 100 described herein. Example implementation 100 includes a transaction device that has an input component (which includes a plurality of input elements), one or more temperature sensors (referred to herein individually as a "temperature sensor" and collectively as "temperature sensors"), and one or more infrared elements (referred to herein individually as a "infrared element" and collectively as "infrared elements"). In some implementations, the transaction device may include one or more temperature control elements (e.g., a heating element and/or a cooling element) (referred to herein individually as a "temperature control element" and collectively as "temperature control elements"). In example implementation 100, the transaction device utilizes the input component, the temperature sensor, the infrared element, and/or the temperature control element to obfuscate an image of the input component that is associated with the user's interaction (e.g., an image of the user interacting with the input component, an image of a thermal signature left by the user interacting with the input component, and/or the like).

As shown in FIG. 1, and by reference 110, the transaction device detects a user interaction with the transaction device based on a temperature change of the input component. For example, the transaction device may determine that a temperature of one or more input elements of the input component reached a threshold temperature. As described herein, in some implementations, each input element of input component may include a temperature sensor. Accordingly, the transaction device may be capable of individually sensing temperatures of each input element of the input component. Therefore, if one or more temperatures of the input element reaches a threshold temperature (e.g., as determined by temperature measurements from the individual temperature sensors), the transaction device may determine that a user interacted with the input component.

According to some implementations described herein, the transaction device may determine whether a temperature of an input element satisfies a threshold temperature, indicating that the user interacted with the input component of the transaction device. In some implementations, the threshold temperature may be a fixed or static temperature used by the transaction device to determine whether a user interacted with the input component. The fixed or static threshold may be a temperature that is determined based on one or more thermal characteristics of the input elements, one or more thermal characteristics of the transaction device, one or more thermal characteristics of an atmosphere (or surroundings) of the transaction device, and/or the like.

Additionally, or alternatively, the transaction device may utilize a dynamic threshold that may be adaptable according to certain characteristics of the transaction device. For example, the threshold may be based on an ambient temperature of the atmosphere or environment of the transaction device. In such a case, it can be assumed that a base temperature of the input elements may be equivalent to the ambient temperature, but once a user interacts with the input elements (e.g., touches, presses, and/or the like), the temperature of the input element will increase from the base temperature due to the heat caused by the physical interaction of the user with the input element. Accordingly, the transaction device may set the threshold temperature to the ambient temperature, and determine, when the temperature of one or more of the input elements rises above the ambient temperature or is outside of a particular range of the ambient temperature (e.g., greater than or less than 0.1 degrees, 0.5 degrees, greater than or less than 1 degree, greater than or less than 3 degrees, and/or the like), the transaction device may determine that the user interacted with the input component. The transaction device may determine the ambient temperature using a temperature sensor (e.g., a separate temperature sensor from the temperature sensors used to sense the temperatures of the input elements) that is associated with the transaction device (e.g., a transaction device mounted to the exterior housing of the transaction device, mounted to a dashboard or panel of the transaction device, and/or the like).

In some implementations, the transaction device may use a threshold temperature that is relative to the temperatures of the input elements. For example, the transaction device may calculate and/or determine an average temperature of the temperatures of each of the input elements. Accordingly, if the transaction device determines that a temperature of one of the input elements is outside of a particular range of the average temperature of the input elements (e.g., is a calculated standard deviation from the average temperature of the input elements), the transaction device may determine that a user interacted with that input element and/or the input component. Accordingly, the threshold temperature used to determine whether a user interacted with the input component may be relative to or associated with the input component and/or one or more of the input elements of the input component. In this way, a dynamic threshold may be achieved without using a temperature sensor to sense the ambient temperature (which may save costs, power resources, and/or processing power associated with installing and/or using an ambient temperature sensor).

In some implementations, the transaction device may determine which type of temperature threshold should be used (e.g. a fixed or static threshold, an ambient temperature-based threshold, an input component temperature-based threshold, and/or the like) based on one or more parameters associated with the transaction device. Such parameters may include one or more of the measured temperatures associated with the transaction device (e.g., an ambient temperature, a temperature associated with the input component (or input elements), a pressure associated with an environment, humidity associated with an environment, a location of the transaction device, a time of day, an ambient light associated with environment, and/or the like). As an example, if the ambient temperature is within a first range, the transaction device may use the ambient temperature as the threshold, and if the ambient temperature is within a second range, the transaction device may use a different temperature threshold, as described herein.

In some implementations, the transaction device may detect that the user interacted with the transaction device using information associated with one or more other sensors and/or input components of the transaction device. For example, using a camera, motion sensor, and/or the like of the transaction device, the transaction device may determine that a user is interacting with the input component and/or is about to interact with the input component (e.g., based on determining that the user is within a threshold distance of the transaction device). Additionally, or alternatively, based on the user interacting with another input device (e.g., by inserting a transaction card into a transaction card terminal of the transaction device), the transaction device may determine that a user has interacted with the input component and/or is about to interact with the input component. Accordingly, in such cases, the transaction device may cause the temperature sensors to sense the temperatures of the input elements to determine whether the user has left a thermal signature on the input component. In this way, the transaction device may conserver power resources and/or processing resources associated with continuously or repeatedly measuring the temperatures and/or receiving temperature measurements associated with the input elements.

In this way, the transaction device may detect a user interaction associated with the input component to permit the transaction device to perform one or more actions to cause information associated with the user interaction to be obfuscated (e.g., to cause the input component in the image to appear obfuscated or not appear at all).

As further shown in FIG. 1, and by reference 120, the transaction device causes the infrared element to emit infrared light from a panel of the input component. Additionally, or alternatively, the transaction device may cause one or more temperature control elements to control a temperature associated with the input component. As shown by the darkened input elements (Keys 3, 7, 8, 9), a thermal signature may be left after the user pressed those input elements. Accordingly, to prevent a capture device from capturing a thermal image of the thermal signatures, the transaction device may use an infrared element and/or the temperature control elements to mask and/or cause an image of the thermal signature to be obfuscated.

As shown in example implementation 100, an input component (shown as a keypad) may be encompassed by an infrared element. The infrared element may be embedded within a dashboard or panel of the transaction device that holds the input component in place. The infrared element may include an optic that can receive the infrared light from a light emitter or light source (e.g., an infrared light emitting diode (LED)) and redirect and/or project the light outward from the transaction device in a manner that radiates infrared light surrounding the input component. For example, the infrared element may provide an infrared beam of light that may be used to blind an image capture device. In some implementations, the transaction device may case the infrared element to emit infrared light in a pulse pattern. For example, based on one or more parameters (e.g., an amount of ambient lighting in a surrounding area of the input component, a determined position of a user or fraudulent individual that may be attempting to capture an image of the transaction device, and/or the like) the transaction device may instruct the infrared element to emit infrared light in a pulse that may correspondingly reflect light according to the parameters. Accordingly, the light may be reflected from the input component in a direction from which the fraudulent individual is attempting to capture an image of the input component and/or of the user interacting with the input component.

Additionally, or alternatively, each input element of the input component may include a temperature control element. Accordingly, the transaction device may be capable of individually controlling the temperature of each of the input elements of the input component. Therefore, based on detecting that the user interacted with the input component, the transaction device may cause the temperature control elements to adjust the temperature of the input elements to be within a threshold range of each (e.g., within 0.1 degrees, within 1 degree, within 2 degrees, and/or the like). Accordingly, an image capture device that captures a thermal image of the input component may capture an image of the input component that does not include a thermal signature associated with the user interaction.

In some implementations, the transaction device may use the infrared element and/or the temperature control element to emit light and/or control the temperature of the input component until the transaction device determines that a thermal signature cannot be detected in an image of the input component (without the infrared element emitting light or temperature control elements controlling a temperature associated with the input component). For example, the transaction device may deactivate or turn off the infrared element and/or cease instructions to the temperature control elements to control the temperature of the elements after a threshold time period (e.g., a time period corresponding to a thermal signal associated with the user interaction dissipating from the input elements). Additionally, or alternatively, the transaction device may monitor the temperature of the input elements until the temperatures of the input elements return to a base temperature (e.g., an ambient temperature) and/or until the temperature of the input elements are within a threshold range of one another (e.g., due to the temperature control elements increasing or decreasing respective temperatures of the input elements). Once the transaction device determines that the input elements have returned to a base temperature (e.g., indicating that the thermal signature has dissipated) or once the temperature of the input elements are within a threshold range of another (which would prevent detection of any thermal signature because the temperature of the input elements are the same or similar), the transaction device may cause the infrared element to stop emitting infrared light and/or cause the temperature control elements to stop controlling the temperature of the input elements (e.g., assuming the input elements will uniformly return to the base temperature together).

In this way, the transaction device may use the infrared elements and/or temperature control elements to cause a thermal image of the transaction machine and/or input component to be obfuscated.

As further shown in FIG. 1, and by reference 130, a fraudulent individual (e.g., an unauthorized user) may attempt to capture an image of the transaction device and/or keypad. In some implementations, the fraudulent individual may attempt to capture the image after the user performs a transaction and/or leaves an area of the transaction device, but within an amount of time where a thermal signature may be detectable in a thermal image captured by the image capture device. However, as described herein, due to the transaction device using the infrared element and/or temperature control elements, the appearance of the transaction device and/or input component (e.g., which may include a thermal signature associated with the user interaction) may be obfuscated within the thermal image.

As an example, assume that the transaction device is an ATM device and that an ATM user wishes to utilize a transaction card with the ATM device to receive money from an account associated with the transaction card. Further assume that the fraudulent individual (e.g., a potential thief) has an image capture device (e.g., a device capable of capturing thermal images) and approaches the ATM to capture an image of the input component (e.g., while the user is performing the transaction, after the user leaves the ATM, and/or the like). As described herein, the transaction device may use the infrared element and/or temperature control elements to cause any images of the transaction device and/or input component to be obfuscated such that a thermal signature associated with the user interacting with the input component cannot be detected in the thermal image.

In this scenario, the fraudulent individual may attempt to capture an image of the transaction device and/or input component either while the user is interacting with the transaction device and/or input component or within a threshold time period (e.g., a period of time associated with a thermal signature dissipating from the input component) after the user has interacted with the transaction device or input component.

As further shown in FIG. 1, and by reference 140, the image captured of the input component is obfuscated by the infrared light and/or the temperature of the input elements of the input component. Accordingly, a thermal image of the input component cannot be used to detect a thermal signature associated with the user interacting with the input component of the transaction device.

As shown in the image, the infrared element, while emitting infrared light, may cause surrounding light to be reflected toward the image capture device of the fraudulent individual. Accordingly, the reflected light may blind the image capture device and/or obfuscate an image of the transaction device and/or input component.

As shown by the image of the keypad, the transaction device may cause the temperature control elements to adjust the temperature of the input elements of the input component to be a same temperature (or within a same temperature range). For example, as shown in FIG. 1, to ensure that the thermal signature associated with keys 3, 7, 8, and 9 being pressed cannot be detected, the transaction device may cause temperature control elements to increase the temperature of keys 1, 2, 4, 5, and 6 to a same or similar temperature as keys 3, 7, 8, and 9. Additionally, or alternatively, the transaction device may cause the temperature control elements to cool keys 3, 7, 8, and 9 to cause the thermal signature on the keys to dissipate (e.g., more quickly than if the temperature control elements did not actively cool the keys).

In some implementations, the transaction device may cause one or more input elements to be a same temperature (e.g., a temperature of an input element after the input element was pressed by the user). For example, the transaction device may cause a random set of the input elements (e.g., one or more of input elements including the input elements that were pressed by the user or other input elements that were not pressed by the user during the user interaction) to be heated or cooled to a same temperature. In this way, the input elements that are the same temperature may all appear to have a thermal signature, though some of the input elements may not have a thermal signature that resulted from the user interaction. Accordingly, a fraudulent individual may not be able to determine which input elements were pressed by the user during the user interaction.

Accordingly, as described herein, the transaction device may perform one or more actions, utilizing one or more components (e.g., a temperature sensor, an infrared element, a temperature control element, and/or the like) to obfuscate thermal information associated with the user interacting with the input component. In this way, the transaction device may prevent unlawful access to personal information and/or sensitive information associated with the user. Therefore, the transaction device, as described herein, may conserve any computing resources (e.g., processing resources, memory resources, power resources, and/or the like) and/or network resources involved in correcting any fraudulent activity that would have been allowed without the use of the transaction device as described herein.

As indicated above, FIG. 1 is provided merely as an example. Other examples may differ from what is described with regard to FIG. 1.

FIG. 2 includes diagrams of example implementations 210, 220 described herein. Example implementations 210, 220 are top views of example infrared elements associated with input components described herein.

As shown in FIG. 2, example implementation 210 includes an infrared element that is associated with an input component. An optic associated with the infrared element of example 210 encompasses (e.g., surrounds, frames, outlines, and/or the like) the input component, which includes input elements shown as keys 1-9. Using the optic in example implementation 210, infrared light emitted, from the surface of the input component and via the infrared element, may cause infrared light to surround the input component and reflect any additional light in the area above the input component.

As further shown in FIG. 2, example implementation 210 includes an optic of the infrared element that encompasses each of the input elements (e.g., each of keys 1-9) of the input component. In this way light may not only be emitted around the input component, but also may be emitted between input elements of the input component.

In some implementations, one or more of the input elements may be backlit using an infrared element as described herein. Alternatively, the input elements may not be backlit with the infrared element so as not to enable detection of oils or other residue associated with the user interaction being detectable on the input elements, due to the oils or reside reflecting or blocking any backlit infrared light.

In some implementations, the infrared elements are configured to be removeable and/or to be added to the transaction device (e.g., as an aftermarket part or kit). For example, the infrared elements but may be fixed to (e.g., glued using an adhesive, attached to, placed on, and/or the like) the transaction device to permit the transaction device to control the infrared elements, as described herein. More specifically, a service representative associated with the transaction device (e.g., a technician) may add the infrared elements (e.g., by attaching an optic of the infrared element to a panel of the transaction device, supplying power to the infrared elements from the transaction device, and/or communicatively coupling one or more of the infrared elements to a control component of the transaction device) to the transaction device to permit the transaction device to use the one or more infrared elements as described herein.

As indicated above, FIG. 2 is provided merely as an example. Other examples may differ from what is described with regard to FIG. 2.

Figure 3:
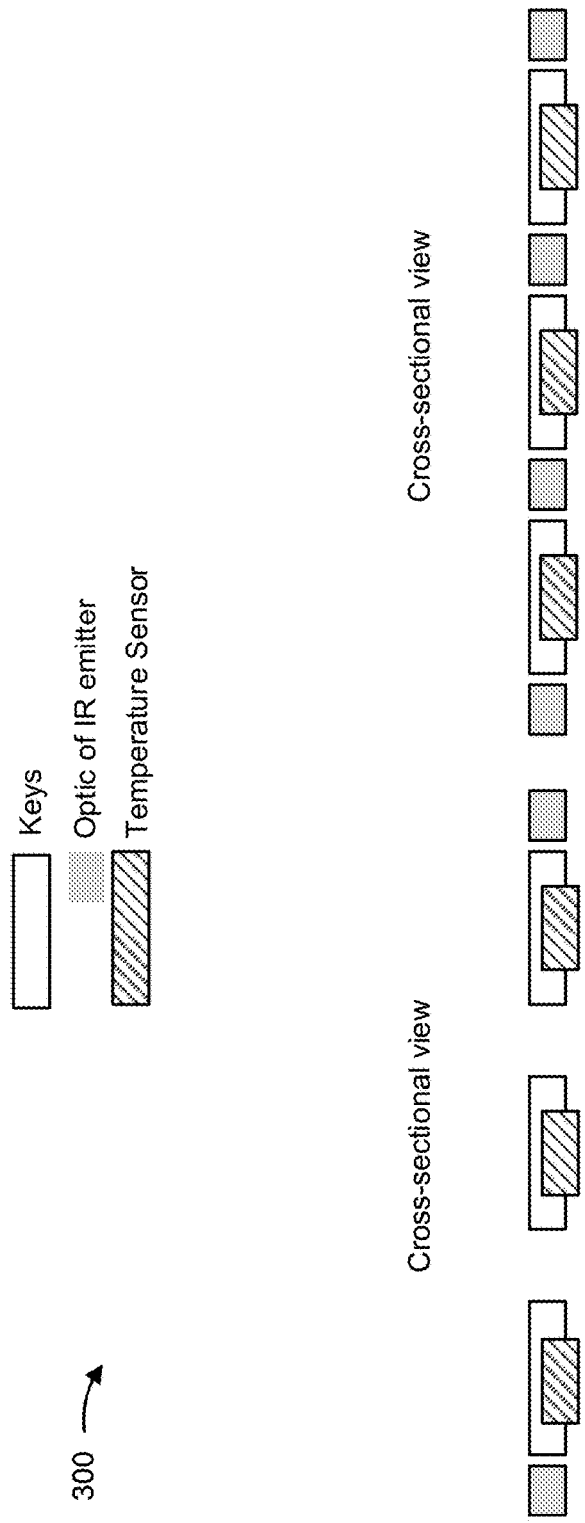

FIG. 3 includes diagrams of an example implementation 300 as described herein. Example implementation 300 includes cross-sectional views of an example layout of infrared elements, input elements, and temperature sensors described herein. The infrared elements and/or input elements of example implementation 300 may correspond to the infrared elements and input elements of example implementations 210, 220.

As shown in FIG. 3, the input elements may include temperature sensors that are attached to the input elements. The input elements may be formed from a thermal insulator material that provides adequate thermal conductance and/or thermal insulation to permit the temperature sensors to detect the temperature of the input elements. Such thermal conductance may enable a thermal signature to be formed on an input element when a user interacts with the input element, as described herein. Accordingly, due to the thermal conductance of the input elements, the temperature sensors may sense and provide temperature measurements associated with the input elements.

In this way, one or more temperature sensors may be configured to determine a temperature associated with an input element to permit the transaction device to detect a user interaction with the input element, and correspondingly cause an infrared element to emit infrared light to cause capture information (e.g., a thermal image of the input component) associated with the user interaction to be obfuscated (e.g., so that a thermal signature on the input elements cannot be detected).

As indicated above, FIG. 3 is provided merely as an example. Other examples may differ from what is described with regard to FIG. 3.

Figure 4:
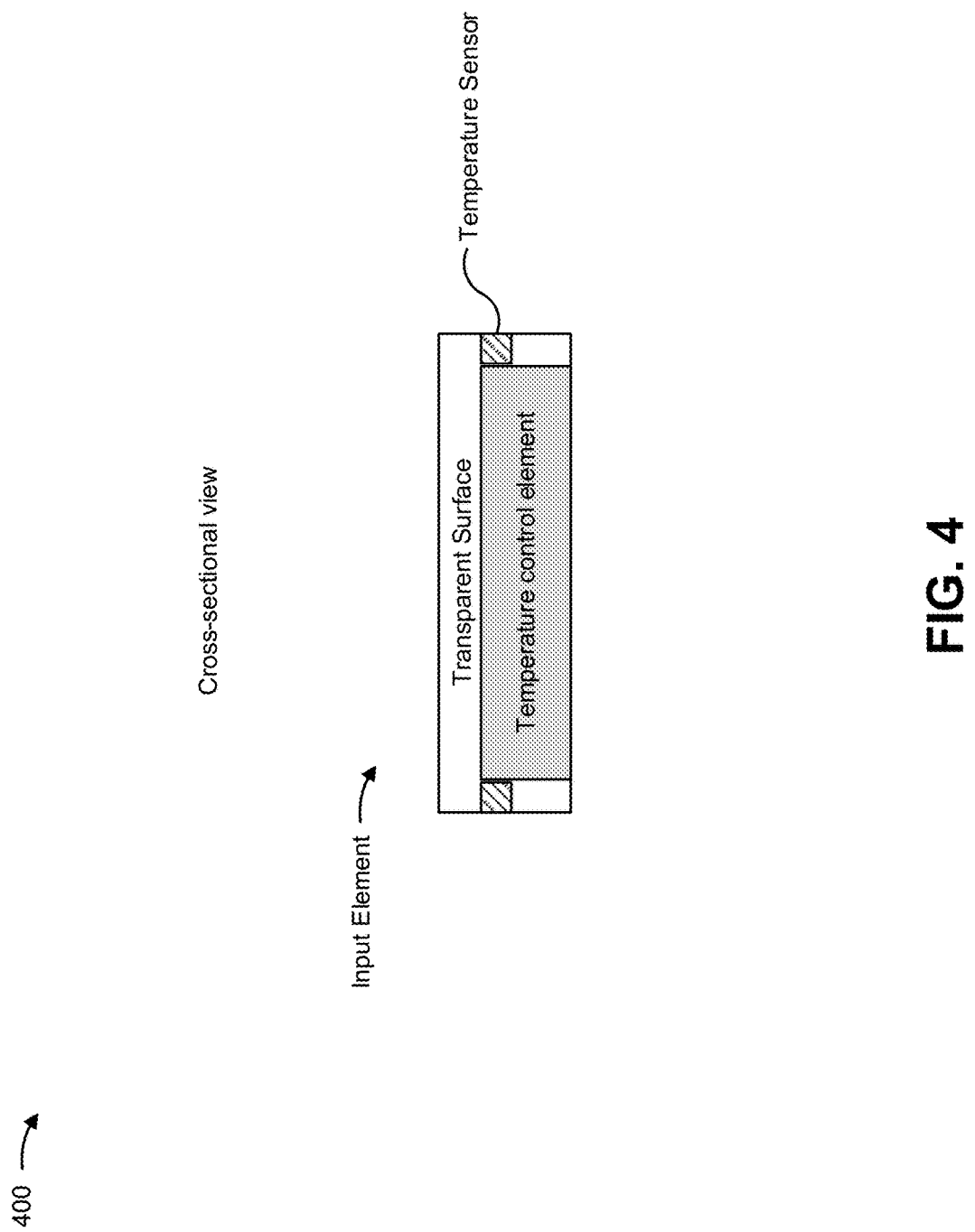

FIG. 4 is a diagram of an example implementation 400 described herein. In example implementation 400, an example of an input element is shown that includes a temperature control element and a temperature sensor. As shown in FIG. 4, the input element may include a thermally transparent surface and/or a thermally conductive surface. In this way, when the temperature control element is instructed to increase and/or decrease in temperature, the surface of the input element may correspondingly increase or decrease in temperature and/or appear to increase or decrease in temperature. Furthermore, the surface of the input element may be configured to absorb heat and/or cool according to the temperature control element. Accordingly, the temperature control element of example implementation 400 may be used to mask or dissipate a thermal signature on the surface of the input element by controlling the temperature of the input element. Additionally, or alternatively, the temperature sensor may be configured to indicate whether the temperature control element is to heat or cool the surface of the input element. For example, the transaction device may receive temperature measurements from the temperature sensor and instruct the temperature control element to control the temperature of the input element according to the temperature measurement. In some implementations, the transparent surface may be formed from a thermal insulator material that is configured to maintain a temperature and/or resist thermal radiation (e.g., from a user) to reduce a temperature level of a thermal signature.

In this way, an input element of a transaction device may include a temperature control element to control the temperature of an input element as described herein.

As indicated above, FIG. 4 is provided merely as an example. Other examples may differ from what is described with regard to FIG. 4.

In this way, a transaction device may use an infrared element to cause an image of an input component to be obfuscated by reflecting light to blind an image capture device so that the image capture device cannot capture an image of a thermal signature associated with a user interaction. Additionally, or alternatively, the transaction device may cause temperature control elements to control temperatures of input elements of the input component so that a thermal signature associated with the user interaction is masked (e.g., by the temperatures of all input elements of the input component being the same or within a threshold range so that the thermal signature cannot be detected). In this way, the transaction device may prevent fraudulent individuals from gaining access to personal and/or sensitive information associated with a user and/or a user's account.

Figure 5:
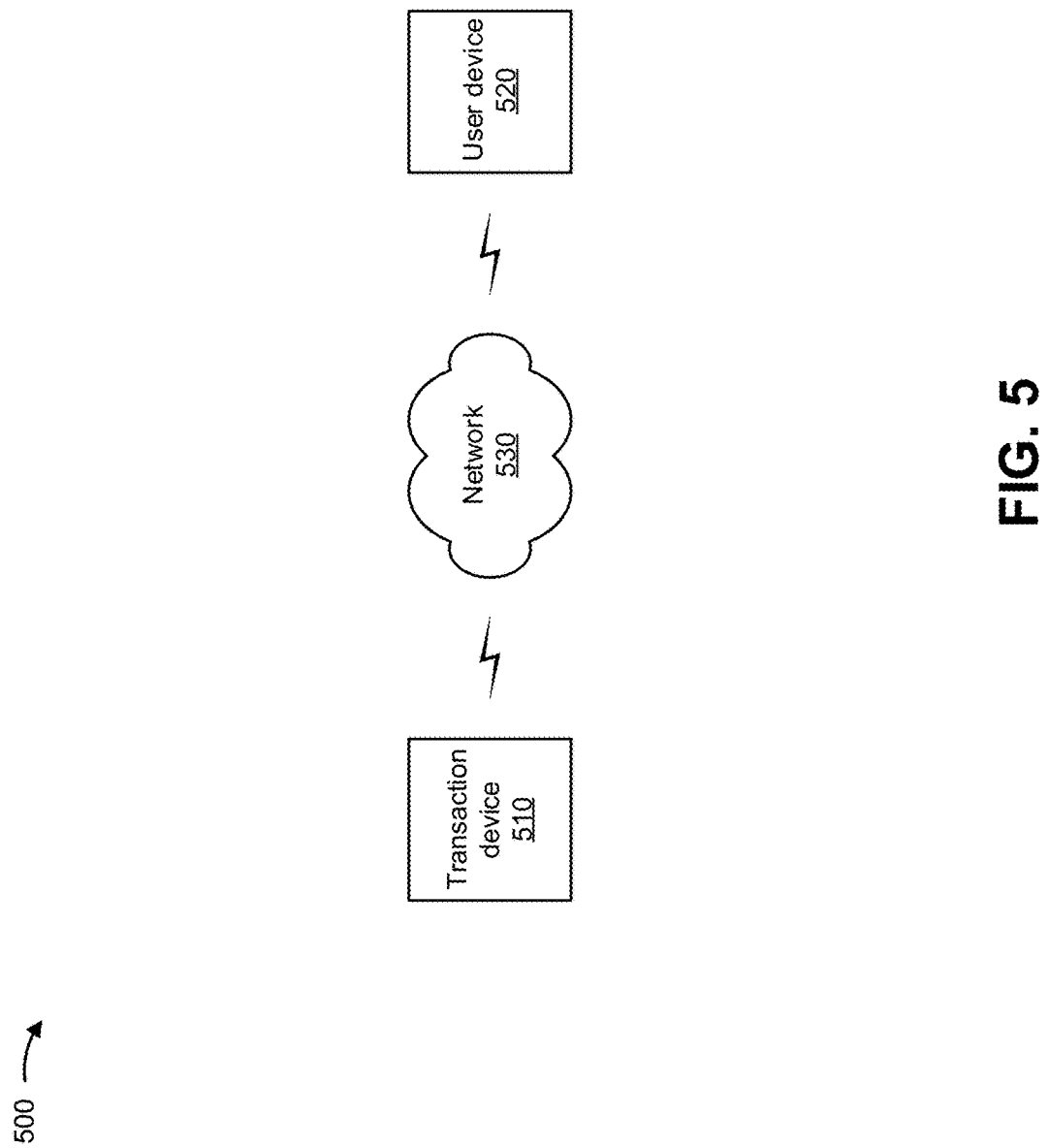
FIG. 5 is a diagram of an example environment in which systems and/or methods, described herein, may be implemented.

FIG. 5 is a diagram of an example environment 500 in which systems and/or methods described herein may be implemented. As shown in FIG. 5, environment 500 may include a transaction device 510, a user device 520, and a network 530. Devices of environment 500 may interconnect via wired connections, wireless connections, or a combination of wired and wireless connections.

Transaction device 510 includes one or more devices capable of receiving, generating, storing, processing, and/or providing information, such as information described herein. For example, transaction device 510 may include an automated teller machine (ATM) device, a point of sale (POS) device, a kiosk device, and/or the like.

The ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. The POS device may include an electronic device used to process transaction card payments at retail locations. The POS device may read information from a transaction card (e.g., a credit card, a debit card, a gift card, and/or the like), and may determine whether there are sufficient funds in an account associated with the transaction card for a transaction. The POS device may transfer funds from the account associated with the transaction card to an account of a retailer and may record the transaction. The kiosk device may include a computer terminal featuring specialized hardware and software that provides access to information and/or applications for communication, commerce, entertainment, education, and/or the like.

In some implementations, transaction device 510 may include an input component (e.g., a keypad, a keyboard, a touchscreen display, and/or the like) for receiving input data from a user, and one or more temperature sensors, one or more infrared elements (e.g., infrared lights, infrared light-emitting diodes (LEDs), and/or the like) associated with the input component, and/or one or more temperature control elements, as described elsewhere herein. In such implementations, the infrared elements and/or temperature control elements may cause capture information and/or image capture of the input component (e.g., by user device 520) to be obfuscated.

User device 520 includes one or more devices capable of receiving, generating, storing, processing, and/or providing information, such as information described herein. For example, user device 520 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 520 may obtain capture information associated with transaction device 510 (e.g., images of transaction device 510 or of a component of transaction device 510 and/or a user of transaction device 510).

Network 530 includes one or more wired and/or wireless networks. For example, network 530 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
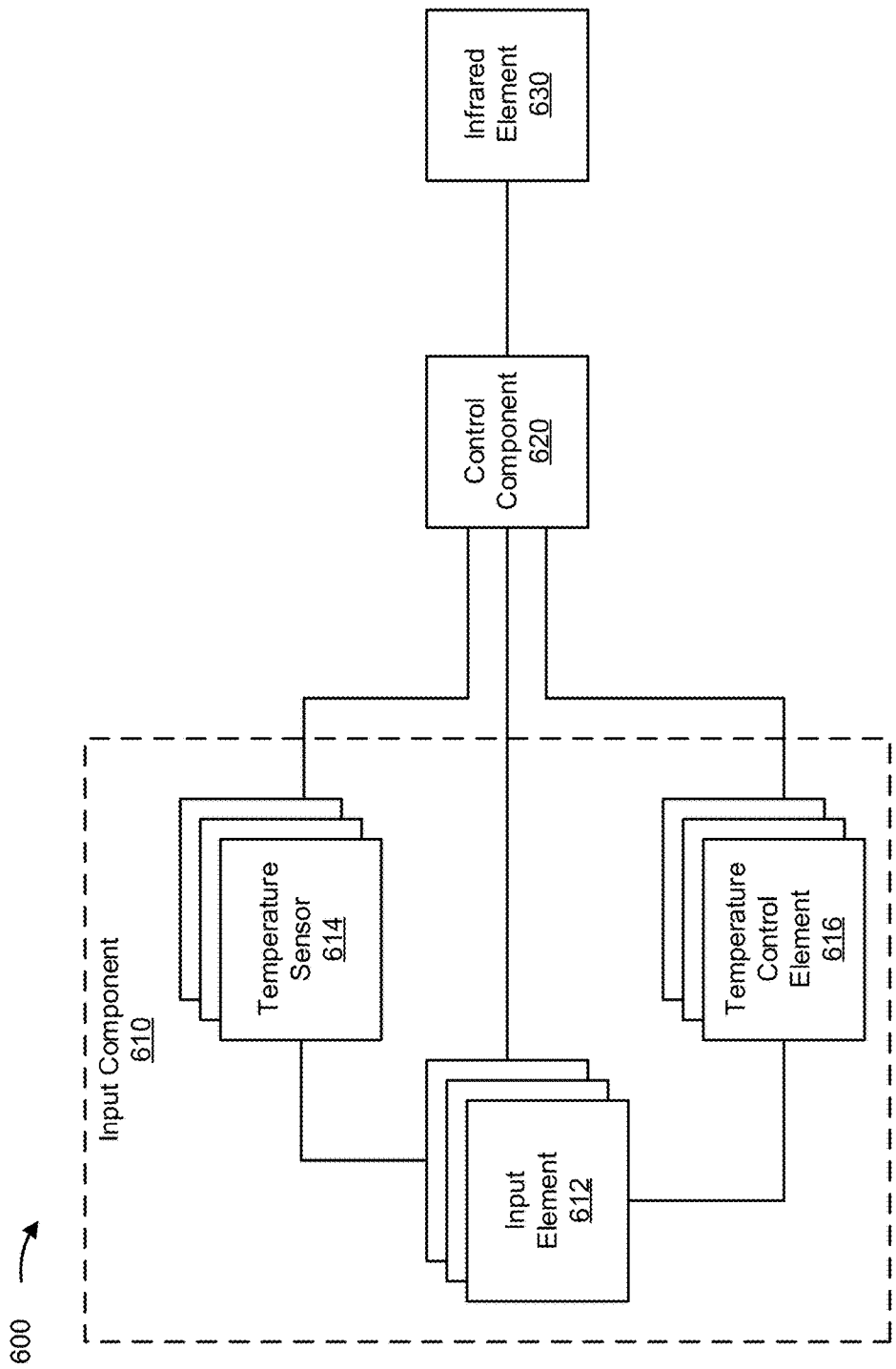
FIG. 6 is a diagram of example components of a transaction device of FIG. 5.

FIG. 6 is a diagram of example components of a transaction device 600. Transaction device 600 may correspond to transaction device 510 of FIG. 5. In some implementations, transaction device 600 of FIG. 6 may include one or more devices 600 and/or one or more components of transaction device 600. As shown in FIG. 6, transaction device 600 may include an input component 610, which includes one or more input elements 612, one or more temperature sensors 614, and one or more temperature control elements 616. Additionally, or alternatively, transaction device 600 may include a control component 620 and an infrared element 630.

Input component 610 includes a component that permits transaction device 600 to receive information, such as via user input (e.g., a touch screen display, a keyboard, a keypad, a mouse, a button, a switch, and/or the like). Input elements 612 include components that permit a user to interact with input component 610 (e.g., sensor pixels of a touchscreen, keys or buttons of a keyboard, keys or buttons of a keypad, buttons and/or trackballs of a mouse, and/or the like). Temperature sensors 614 include components that are capable of sensing or measuring temperature. Temperature control elements 616 include components that control temperature (e.g., via heating elements, cooling elements, and/or the like). In some implementations, each input element 612 of a set of input elements 612 (e.g., each key of a keyboard or each key of a keypad) of input component 610 may include a temperature sensor 614 and a temperature control element 616. Accordingly, temperatures of input elements 612 may be independently sensed and/or controlled as described herein.

Control component 620 may include any component (e.g., a processor, microprocessor, and/or the like) capable of receiving an input from input component 610 via input elements 612, receiving temperature measurements associated with input elements 612 from temperature sensors 614, controlling temperature of temperature elements 612 via temperature control elements 616, and/or controlling infrared element 630 to emit infrared light.

Infrared element 630 may include any infrared light source (e.g., an infrared light emitting diode, and/or the like). Additionally, or alternatively, the infrared element may include one or more optics (e.g., glass, plastic, and/or the like) configured to reflect, direct, and/or project infrared light, from the infrared light source, in a particular manner, as described herein.

The number and arrangement of components shown in FIG. 6 are provided as an example. In practice, transaction device 600 may include additional components, fewer components, different components, or differently arranged components than those shown in FIG. 6. Additionally, or alternatively, a set of components (e.g., one or more components) of transaction device 600 may perform one or more functions described as being performed by another set of components of transaction device 600.

Figure 7:
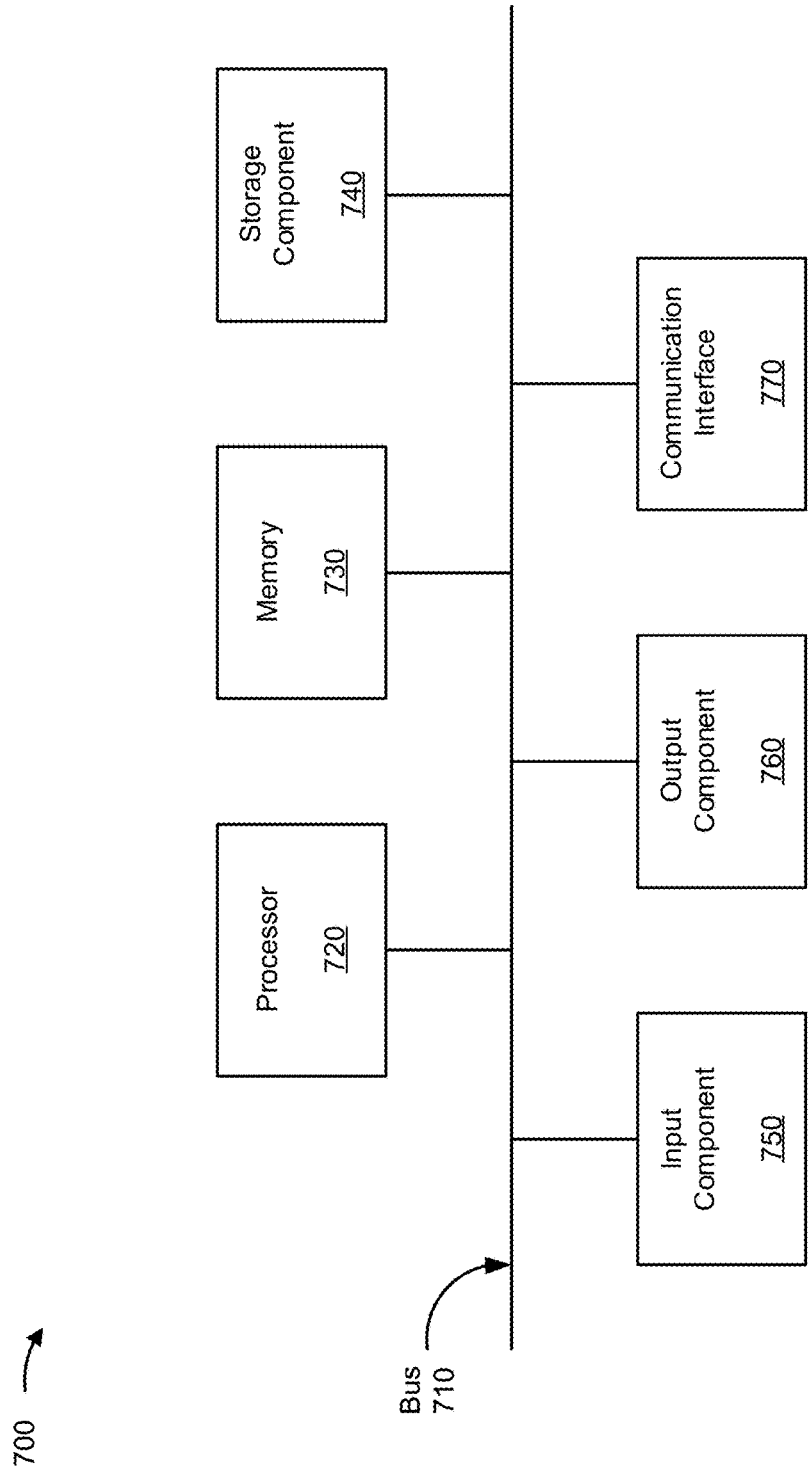
FIG. 7 is a diagram of example components of one or more devices of FIG. 5.

FIG. 7 is a diagram of example components of a device 700. Device 700 may correspond to transaction device 510 and/or user device 520. In some implementations, transaction device 510 and/or user device 520 may include one or more devices 700 and/or one or more components of device 700. As shown in FIG. 7, device 700 may include a bus 710, a processor 720, a memory 730, a storage component 740, an input component 750, an output component 760, and a communication interface 770.

Bus 710 includes a component that permits communication among the components of device 700. Processor 720 is implemented in hardware, firmware, and/or a combination of hardware and software. Processor 720 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 720 includes one or more processors capable of being programmed to perform a function. Memory 730 includes a random-access memory (RAM), a read only memory (ROM), and/or another type of dynamic or static storage device (e.g., a flash memory, a magnetic memory, and/or an optical memory) that stores information and/or instructions for use by processor 720. Processor 720 may correspond to control component 620 of FIG. 6.

Storage component 740 stores information and/or software related to the operation and use of device 700. For example, storage component 740 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 750 includes a component that permits device 700 to receive information, such as via user input (e.g., a touch screen display, a keyboard, a keypad, a mouse, a button, a switch, and/or a microphone). Additionally, or alternatively, input component 750 may include a sensor for sensing information (e.g., a global positioning system (GPS) component, an accelerometer, a gyroscope, and/or an actuator). In some implementations, input component 750 may correspond to input component 610 of FIG. 6. Output component 760 includes a component that provides output information from device 700 (e.g., a display, a speaker, and/or one or more light-emitting diodes (LEDs)). In some implementations, output component 760 may include infrared element 630.

Communication interface 770 includes a transceiver-like component (e.g., a transceiver and/or a separate receiver and transmitter) that enables device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, or the like.

Device 700 may perform one or more processes described herein. Device 700 may perform these processes based on processor 720 executing software instructions stored by a non-transitory computer-readable medium, such as memory 730 and/or storage component 740. A computer-readable medium is defined herein as a non-transitory memory device. A memory device includes memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 7 are provided as an example. In practice, device 700 may include additional components, fewer components, different components, or differently arranged components than those shown in FIG. 7. Additionally, or alternatively, a set of components (e.g., one or more components) of device 700 may perform one or more functions described as being performed by another set of components of device 700.

Figure 8:
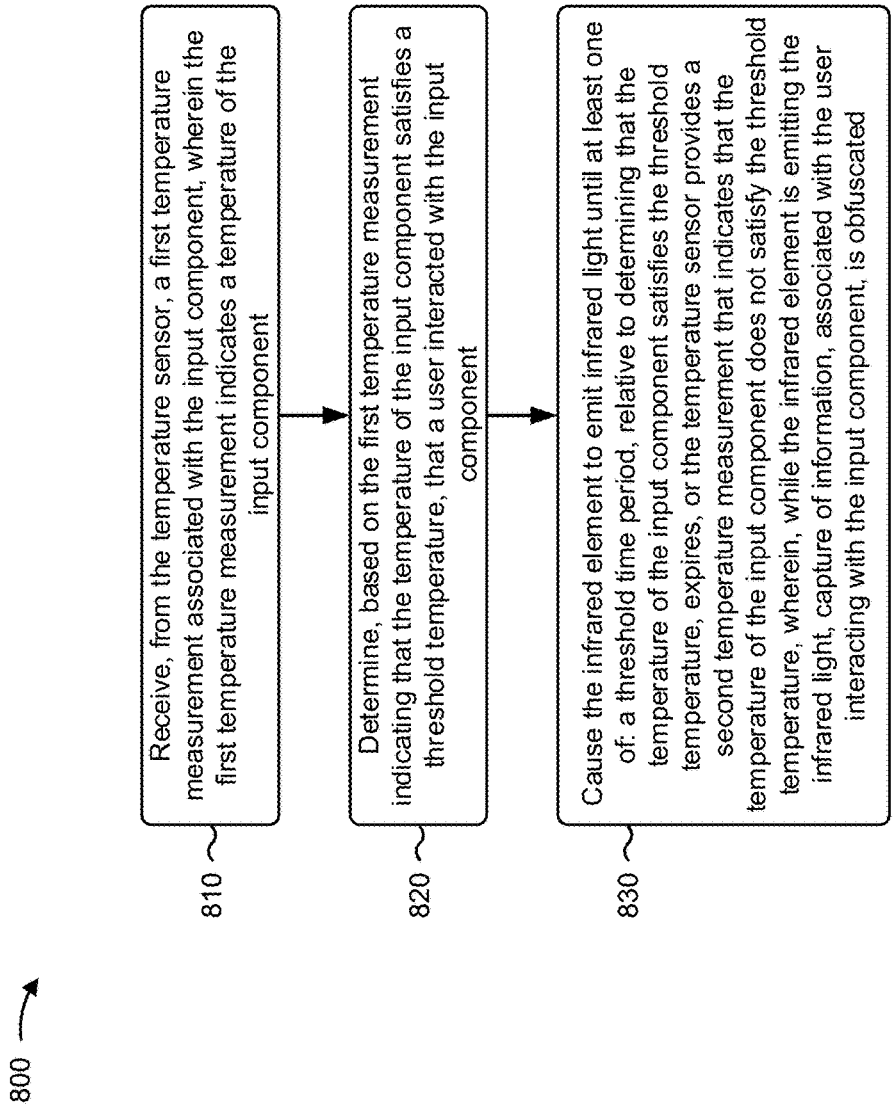
FIGS. 8-10 are flow charts of an example process associated with obfuscating input data provided to a transaction device.

FIG. 8 is a flow chart of an example process 800 associated with obfuscating input data provided to a transaction device. In some implementations, one or more process blocks of FIG. 8 may be performed by a transaction device (e.g. transaction device 510). In some implementations, one or more process blocks of FIG. 8 may be performed by another device or a group of devices separate from or including the transaction device, such as a user device (e.g., user device 520).

As shown in FIG. 8, process 800 may include receiving, from the temperature sensor, a first temperature measurement associated with the input component, wherein the first temperature measurement indicates a temperature of the input component (block 810). For example, the transaction device (e.g., using processor 720, memory 730, storage component 740, input component 750, communication interface 770, and/or the like) may receive, from the temperature sensor, a first temperature measurement associated with the input component, as described above. In some implementations, the first temperature measurement indicates a temperature of the input component.

As shown in FIG. 8, process 800 may include determining, based on the first temperature measurement indicating that the temperature of the input component satisfies a threshold temperature, that a user interacted with the input component (block 820). For example, the transaction device (e.g., using processor 720, memory 730, storage component 740, input component 750, communication interface 770, and/or the like) may determine, based on the first temperature measurement indicating that the temperature of the input component satisfies a threshold temperature, that a user interacted with the input component, as described above.

As shown in FIG. 8, process 800 may include causing the infrared element to emit infrared light until at least one of: a threshold time period, relative to determining that the temperature of the input component satisfies the threshold temperature, expires, or the temperature sensor provides a second temperature measurement that indicates that the temperature of the input component does not satisfy the threshold temperature, wherein, while the infrared element is emitting the infrared light, capture of information, associated with the user interacting with the input component, is obfuscated (block 830). For example, the transaction device (e.g., using processor 720, memory 730, storage component 740, output component 760, communication interface 770, and/or the like) may cause the infrared element to emit infrared light until at least one of: a threshold time period, relative to determining that the temperature of the input component satisfies the threshold temperature, expires, or the temperature sensor provides a second temperature measurement that indicates that the temperature of the input component does not satisfy the threshold temperature, as described above. In some implementations, while the infrared element is emitting the infrared light, capture of information, associated with the user interacting with the input component, is obfuscated.

Process 800 may include additional aspects, such as any single aspect or any combination of aspects described below and/or in connection with one or more other processes described elsewhere herein.

In some implementations, the infrared element may include an infrared emitter that emits the infrared light and an infrared optic. In some implementations, the infrared optic is shaped to redirect the infrared light to substantially surround the input component when the infrared emitter emits the infrared light.

In some implementations, the input component includes a keypad. In some implementations, the infrared optic is embedded in a base of the keypad. In some implementations, the infrared optic encompasses each input element of the keypad. In some implementations, the capture of the information is obfuscated by obfuscating the temperature of the input component.

In some implementations, the transaction device includes a temperature control element. In some implementations, the transaction device may cause the temperature control element to adjust the temperature of the input component to cause the temperature of the input component not to satisfy the threshold temperature. In some implementations, the transaction device includes a temperature control element. In some implementations, the transaction device may cause the temperature control element to adjust the temperature of the input component to cause the temperature of the input component not to satisfy the threshold temperature. In some implementations, the threshold temperature is relative to an ambient temperature that is measured by the temperature sensor or another temperature sensor that is communicatively coupled to the one or more processors.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Figure 9:
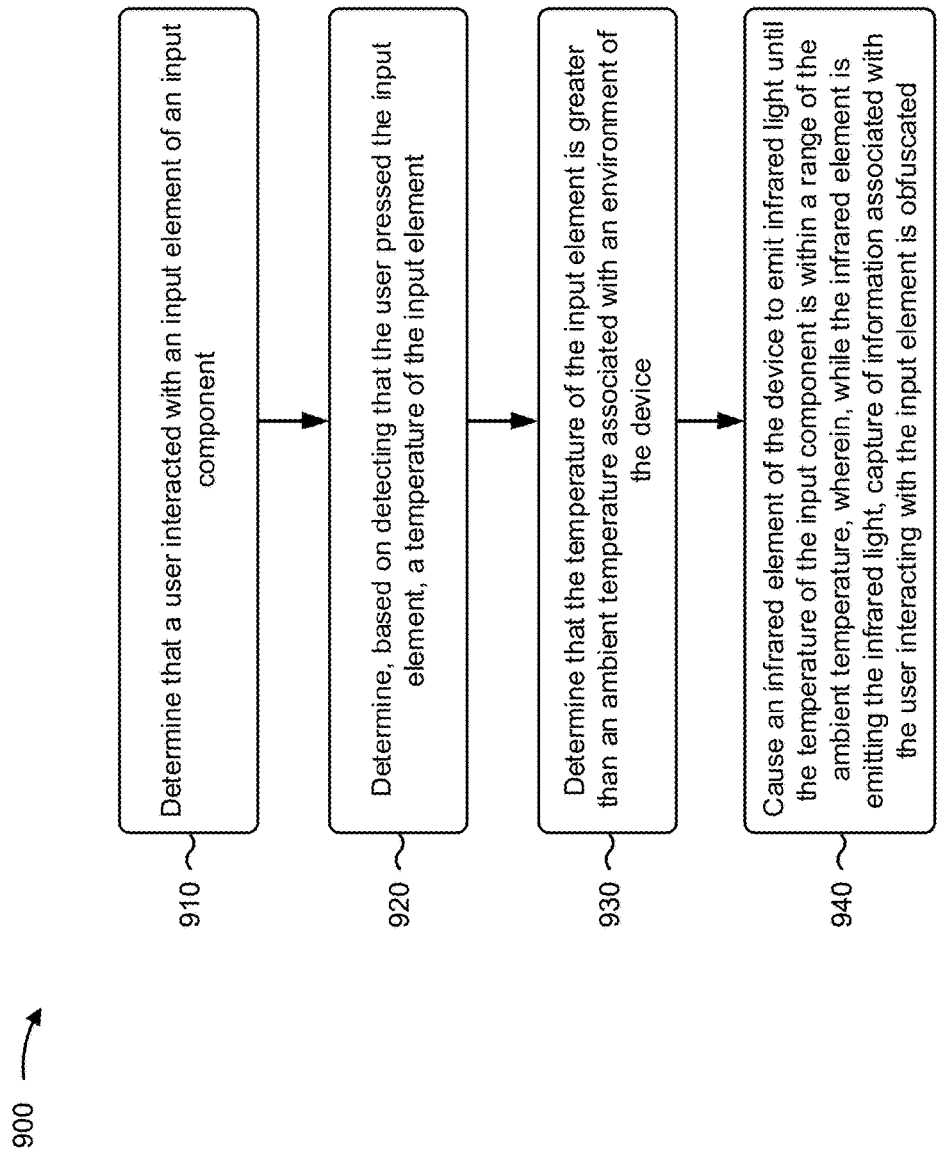

FIG. 9 is a flow chart of an example process 900 associated with obfuscating input data provided to a transaction device. In some implementations, one or more process blocks of FIG. 8 may be performed by a transaction device (e.g., transaction device 510). In some implementations, one or more process blocks of FIG. 8 may be performed by another device or a group of devices separate from or including the transaction device, such as a user device (e.g., user device 520).

As shown in FIG. 9, process 900 may include determining that a user interacted with an input element of an input component (block 910). For example, the transaction device (e.g., using processor 720, memory 730, storage component 740, input component 750, communication interface 770, and/or the like) may determine that a user interacted with an input element of an input component, as described above.

As shown in FIG. 9, process 900 may include determining, based on detecting that the user pressed the input element, a temperature of the input element (block 920). For example, the transaction device (e.g., using processor 720, memory 730, storage component 740, input component 750, communication interface 770, and/or the like) may determine, based on detecting that the user pressed the input element, a temperature of the input element, as described above.

As shown in FIG. 9, process 900 may include determining that the temperature of the input element is greater than an ambient temperature associated with an environment of the device (block 930). For example, the transaction device (e.g., using processor 720, memory 730, storage component 740, communication interface 770, and/or the like) may determine that the temperature of the input element is greater than an ambient temperature associated with an environment of the device, as described above.

As shown in FIG. 9, process 900 may include causing an infrared element of the device to emit infrared light until the temperature of the input component is within a range of the ambient temperature, wherein, while the infrared element is emitting the infrared light, capture of information associated with the user interacting with the input element is obfuscated (block 940). For example, the transaction device (e.g., using processor 720, memory 730, storage component 740, output component 760, communication interface 770, and/or the like) may cause an infrared element of the device to emit infrared light until the temperature of the input component is within a range of the ambient temperature, as described above. In some implementations, while the infrared element is emitting the infrared light, capture of information associated with the user interacting with the input element is obfuscated.

Process 900 may include additional aspects, such as any single aspect or any combination of aspects described below and/or in connection with one or more other processes described elsewhere herein.

In some implementations, the transaction device includes at least one of a kiosk device, an automated teller machine (ATM) device, or a point of sale (POS) device.

In some implementations, the user is determined to have used the input component based on at least one of: a transaction associated with the device occurring, a motion sensor indicating that the user is within a threshold distance of the device, or the temperature of the input element being greater than the ambient temperature.

In some implementations, the input component comprises a keypad, and the input element is a key of the keypad. In some implementations, the temperature of the input element is based on a temperature measurement from a temperature sensor. In some implementations, the temperature sensor is configured to measure a surface temperature of the key. In some implementations, the temperature of the input element corresponds to the surface temperature of the key.

In some implementations, based on determining that the temperature of the input element is greater than the ambient temperature, the transaction device may cause a temperature control element to cause the temperature of the input element to be within the range of the ambient temperature.

In some implementations, the input element is one input element of a plurality of input elements of the input component, and the transaction device may, based on determining that the temperature of the input element is greater than the ambient temperature, cause a temperature control element to cause a temperature of each of the plurality of input elements to be within the range of the ambient temperature.

In some implementations, the input element is one of a plurality of input elements of the input component that were pressed by the user, and the transaction device may cause the infrared element of the device to emit the infrared light until a temperature associated with each of the plurality of input elements of the input component is within the range of the ambient temperature.

Although FIG. 9 shows example blocks of process 900, in some implementations, process 900 may include additional blocks, fewer blocks, different blocks, or differently arranged blocks than those depicted in FIG. 9. Additionally, or alternatively, two or more of the blocks of process 900 may be performed in parallel.

Figure 10:
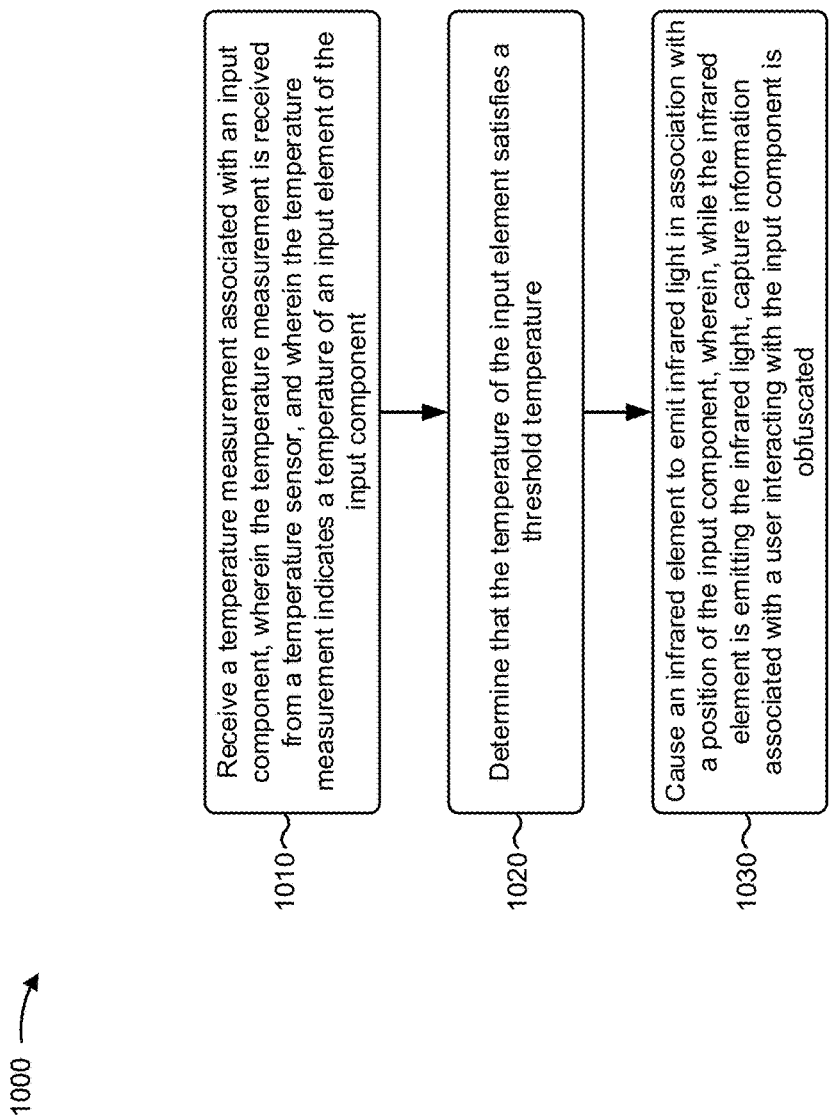

FIG. 10 is a flow chart of an example process 1000 associated with obfuscating input data provided to a transaction device. In some implementations, one or more process blocks of FIG. 8 may be performed by a transaction device (e.g. transaction device 510). In some implementations, one or more process blocks of FIG. 8 may be performed by another device or a group of devices separate from or including the transaction device, such as a user device (e.g., user device 520).

As shown in FIG. 10, process 1000 may include receiving a temperature measurement associated with an input component, wherein the temperature measurement is received from a temperature sensor, and wherein the temperature measurement indicates a temperature of an input element of the input component (block 1010). For example, the transaction device (e.g., using processor 720, memory 730, storage component 740, input component 750, output component 760, communication interface 770, and/or the like) may receive a temperature measurement associated with an input component, wherein the temperature measurement is received from a temperature sensor, as described above. In some implementations, the temperature measurement is received from a temperature sensor, and the temperature measurement indicates a temperature of an input element of the input component.

As shown in FIG. 10, process 1000 may include determining that the temperature of the input element satisfies a threshold temperature (block 1020). For example, the transaction device (e.g., using processor 720, memory 730, storage component 740, input component 750, output component 760, communication interface 770, and/or the like) may determine that the temperature of the input element satisfies a threshold temperature, as described above.

As shown in FIG. 10, process 1000 may include causing an infrared element to emit infrared light in association with a position of the input component, wherein, while the infrared element is emitting the infrared light, capture information associated with a user interacting with the input component is obfuscated (block 1030). For example, the transaction device (e.g., using processor 720, memory 730, storage component 740, input component 750, output component 760, communication interface 770, and/or the like) may cause an infrared element to emit infrared light in association with a position of the input component, as described above. In some implementations, while the infrared element is emitting the infrared light, capture information associated with a user interacting with the input component is obfuscated.

Process 1000 may include additional aspects, such as any single aspect or any combination of aspects described below and/or in connection with one or more other processes described elsewhere herein.

In some implementations, the temperature sensor is configured to measure a plurality of corresponding temperatures of a plurality of input elements of the input component. In some implementations, the input element is one of the plurality of input elements.

In some implementations, the threshold temperature is based on one or more measured temperatures of one or more other input elements of the input component.

In some implementations, the input element is one of a plurality of input elements of the input component. In some implementations, a set of input elements of the plurality of input elements may each include: a thermal material that is configured to maintain a temperature based on a signal from a temperature control element and a transparent surface. In some implementations, the transaction device may cause the temperature control element to adjust corresponding temperatures of the thermal insulator material of each of the set of input elements to a temperature that satisfies the threshold temperature in order to prevent a thermal image of the input component from indicating, based on a temperature of the set of input elements, that a user pressed one or more of the set of the input elements.

In some implementations, the transaction device may detect that a user is using or has used the input component. In some implementations, the temperature measurement is received based on determining that the user is using or has used the input component. In some implementations, the infrared element is configured to emit the infrared light in a pulse pattern based on ambient lighting in a surrounding area of the input component.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Additionally, or alternatively, a process may include determining a temperature of an input element, wherein the input element is associated with an input component of the device. For example, the transaction device (e.g., using processor 720, memory 730, storage component 740, input component 750, input component 750, communication interface 770, and/or the like) may determine a temperature of an input element. In some implementations, the input element is associated with an input component of the device.

Such a process may further include determining that the temperature of the input element satisfies a threshold temperature. For example, the transaction device (e.g., using processor 720, memory 730, storage component 740, input component 750, input component 750, communication interface 770, and/or the like) may determine that the temperature of the input element satisfies a threshold temperature.

Such a process may further include causing a temperature control element to control a temperature associated with the input element, wherein, while the temperature control element is controlling the temperature associated with the input element, capture of information associated with a user interacting with the input element is obfuscated. For example, the transaction device using processor 720, memory 730, storage component 740, output component 760, input component 750, communication interface 770, and/or the like), the transaction device may cause a temperature control element to control a temperature associated with the input element. In some implementations, while the temperature control element is controlling the temperature associated with the input element, capture of information associated with a user interacting with the input element is obfuscated.

Such a process may include additional aspects, such as any single aspect or any combination of aspects described below and/or in connection with one or more other processes described elsewhere herein.

In some implementations, the transaction device may cause the temperature control element to adjust the temperature of the input element to not satisfy the threshold temperature. In some implementations, the transaction device may cause the temperature control element to adjust the temperature of the input element to be within a threshold range of corresponding temperatures of the one or more other input elements. In some implementations, the transaction device may cause the temperature control element to adjust one or more temperatures of the one or more other input elements to be within a threshold range of the input element.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   an input component;
   an infrared element associated with the input component, wherein the infrared element comprises:
      an infrared emitter that emits infrared light, and
      an infrared optic,
         wherein the infrared optic is shaped to redirect the infrared light to substantially surround the input component when the infrared emitter emits the infrared light;
   a temperature sensor;
   one or more memories; and
   one or more processors, communicatively coupled to the one or more memories, to:
      receive, from the temperature sensor, a first temperature measurement associated with the input component,
         wherein the first temperature measurement indicates a temperature of the input component;
      determine, based on the first temperature measurement indicating that the temperature of the input component satisfies a threshold temperature, that a user interacted with the input component; and
      cause the infrared element to emit the infrared light until at least one of:
         a threshold time period, relative to determining that the temperature of the input component satisfies the threshold temperature, expires, or
         the temperature sensor provides a second temperature measurement that indicates that the temperature of the input component does not satisfy the threshold temperature,
            wherein, while the infrared element is emitting the infrared light, capture of information, associated with the user interacting with the input component, is obfuscated.

2. The device of claim 1, wherein the input component includes a keypad, and
   wherein the infrared optic is embedded in a base of the keypad, and
   wherein the infrared optic encompasses each input element of the keypad.

3. The device of claim 1, wherein the capture of the information is obfuscated by obfuscating the temperature of the input component.

4. The device of claim 1, wherein the device further comprises:
   a temperature control element, and
   wherein the one or more processors are further to:
      cause the temperature control element to adjust the temperature of the input component to cause the temperature of the input component not to satisfy the threshold temperature.

5. The device of claim 1, wherein the device further comprises:
   a temperature control element, and
   wherein the one or more processors are further to:
      cause the temperature control element to adjust the temperature of the input component to cause the temperature of the input component to satisfy the threshold temperature.

6. The device of claim 1, wherein the threshold temperature is relative to an ambient temperature that is measured by the temperature sensor or another temperature sensor that is communicatively coupled to the one or more processors.

7. The device of claim 1, wherein the infrared element is configured to emit the infrared light in a pulse pattern based on ambient lighting in a surrounding area of the input component.

8. A non-transitory computer-readable medium storing instructions, the instructions comprising:
   one or more instructions that, when executed by one or more processors of a device, cause the one or more processors to:
      determine that a user interacted with an input element of an input component,
         the input component comprising a keypad, and
         the input element being a key of the keypad;
      determine, based on detecting that the user pressed the input element, a temperature of the input element,
         the temperature of the input element being based on a temperature measurement from a temperature sensor,
            wherein the temperature sensor is configured to measure a surface temperature of the key, and
            wherein the temperature of the input element corresponds to the surface temperature of the key;
      determine that the temperature of the input element is greater than an ambient temperature associated with an environment of the device; and
      cause an infrared element of the device to emit infrared light until the temperature of the input component is within a range of the ambient temperature,
         wherein, while the infrared element is emitting the infrared light, capture of information associated with the user interacting with the input element is obfuscated.

9. The non-transitory computer-readable medium of claim 8, wherein the device includes one of:
   a kiosk device,
   an automated teller machine (ATM) device, or
   a point of sale (POS) device.

10. The non-transitory computer-readable medium of claim 8, wherein the user is determined to have used the input component based on at least one of:
- a transaction associated with the device occurring,
- a motion sensor indicating that the user is within a threshold distance of the device, or
- the temperature of the input element being greater than the ambient temperature.

11. The non-transitory computer-readable medium of claim 8, wherein the instructions further comprise:
- one or more instructions that, when executed by the one or more processors, cause the one or more processors to:
  - based on determining that the temperature of the input element is greater than the ambient temperature, cause a temperature control element to cause the temperature of the input element to be within the range of the ambient temperature.

12. The non-transitory computer-readable medium of claim 8, wherein the input element is one input element of a plurality of input elements of the input component, and wherein the instructions further comprise:
- one or more instructions that, when executed by the one or more processors, cause the one or more processors to:
  - based on determining that the temperature of the input element is greater than the ambient temperature, cause a temperature control element to cause a temperature of each of the plurality of input elements to be within the range of the ambient temperature.

13. The non-transitory computer-readable medium of claim 8, wherein the input element is one of a plurality of input elements of the input component that were pressed by the user, and wherein the instructions further comprise:
- one or more instructions that, when executed by the one or more processors, cause the one or more processors to:
  - cause the infrared element of the device to emit the infrared light until a temperature associated with each of the plurality of input elements of the input component is within the range of the ambient temperature.

14. The non-transitory computer-readable medium of claim 8, wherein the ambient temperature is based on one or more measured temperatures of one or more other input elements of the input component.

15. A method, comprising:
- receiving, by a device, a temperature measurement associated with an input component,
  - wherein the temperature measurement is received from a temperature sensor,
  - wherein the temperature measurement indicates a temperature of an input element of the input component, and
  - wherein the input element is one of a plurality of input elements of the input component,
    - wherein a set of input elements of the plurality of input elements each include:
      - a thermal material that is configured to maintain a temperature based on a signal from a temperature control element, and
      - a transparent surface;
- determining, by the device, that the temperature of the input element satisfies a threshold temperature;
- causing, by the device, an infrared element to emit infrared light in association with a position of the input component,
  - wherein, while the infrared element is emitting the infrared light, capture information associated with a user interacting with the input component is obfuscated; and
- causing, by the device, the temperature control element to adjust corresponding temperatures of the thermal material of each of the set of input elements to a temperature that satisfies the threshold temperature to prevent a thermal image of the input component from indicating, based on a temperature of the set of input elements, that a user pressed one or more of the set of the input elements.

16. The method of claim 15, wherein the temperature sensor is configured to measure a plurality of corresponding temperatures of the plurality of input elements.

17. The method of claim 15, wherein the threshold temperature is based on one or more measured temperatures of one or more other input elements of the plurality of input elements.

18. The method of claim 15, further comprising:
- detecting that the user is using or has used the input component,
  - wherein the temperature measurement is received based on determining that the user is using or has used the input component.

19. The method of claim 15, wherein the infrared element is configured to emit the infrared light in a pulse pattern based on ambient lighting in a surrounding area of the input component.

20. The method of claim 15, wherein the threshold temperature is relative to an ambient temperature that is measured by the temperature sensor or another temperature sensor.

* * * * *